United States Patent
Hutchinson et al.

(10) Patent No.: US 7,045,068 B2
(45) Date of Patent: May 16, 2006

(54) APPARATUS AND METHODS FOR SEPARATING SLURRIED MATERIAL

(75) Inventors: Robert J. Hutchinson, Prairieville, LA (US); Richard F. Dawson, Clinton, LA (US)

(73) Assignee: Walker-Dawson Interests, Inc., Clinton, LA (US)

( * ) Notice: Subject to any disclaimer, the term of this patent is extended or adjusted under 35 U.S.C. 154(b) by 5 days.

(21) Appl. No.: 11/131,790

(22) Filed: May 18, 2005

(65) Prior Publication Data

US 2005/0205497 A1    Sep. 22, 2005

Related U.S. Application Data

(63) Continuation of application No. 10/199,777, filed on Jul. 19, 2002, now Pat. No. 6,911,145.

(51) Int. Cl.
   *B01D 29/25* (2006.01)
(52) U.S. Cl. ................................ 210/808; 210/406
(58) Field of Classification Search ............... 210/767, 210/808, 406
   See application file for complete search history.

(56) References Cited

U.S. PATENT DOCUMENTS

| | | |
|---|---|---|
| 86,152 A | 1/1869 | Hancock |
| 137,501 A | 4/1873 | Thayer |
| 250,073 A | 11/1881 | Hudson |
| 368,691 A | 8/1887 | See |
| 436,932 A | 9/1890 | Best |
| 550,244 A | 11/1895 | Blagburn |
| 640,463 A | 1/1900 | Gildea |
| 694,002 A | 2/1902 | Davis |
| 1,653,027 A | 12/1927 | Ward |
| 2,044,088 A | 6/1936 | Lord |
| 2,191,424 A | 2/1940 | Cardinal |
| 2,196,859 A | 4/1940 | Godfrey |
| 2,616,614 A | 11/1952 | Plummer, Jr. |
| 2,632,597 A | 3/1953 | Boeckeler |
| 3,351,235 A | 11/1967 | Paton |
| 3,421,665 A | 1/1969 | Paton |
| 3,877,238 A | 4/1975 | Chang et al. |
| 3,922,112 A | 11/1975 | Miscovich |

(Continued)

FOREIGN PATENT DOCUMENTS

DE    3604616 A1    8/1987

(Continued)

OTHER PUBLICATIONS

Author Unknown, Miratech® Brochure, "Containment & Dewatering"; undated; 8 pages.

*Primary Examiner*—Robert James Popovics
(74) *Attorney, Agent, or Firm*—Sieberth & Patty, L.L.C.

(57) ABSTRACT

An apparatus for separating liquid from a slurry comprised of a solid and a liquid is described. The apparatus comprises a container sized and configured to receive the slurry which container comprises a removable cover sized and configured to enclose an atmosphere within the container when the cover is attached to the container, a filter disposed within the container for separating the liquid from the slurry, and a vacuum pump in fluid communication with the enclosed atmosphere of the container which pump is configured to create a vacuum within the container that causes the liquid to move through the filter, which pump is configured to vacuum material comprised of solid material, liquid material, gas or a combination of two or more of the foregoing. Related methods of separating liquid from the slurry using the apparatus of the invention are also described.

13 Claims, 9 Drawing Sheets

U.S. PATENT DOCUMENTS

| | | |
|---|---|---|
| 3,970,552 A | 7/1976 | Bongert |
| 4,100,872 A | 7/1978 | Matsuno et al. |
| 4,165,571 A | 8/1979 | Chang et al. |
| 4,186,772 A | 2/1980 | Handleman |
| 4,316,680 A | 2/1982 | Phipps et al. |
| 4,681,372 A | 7/1987 | McClure |
| 4,818,389 A | 4/1989 | Tobias et al. |
| 4,871,454 A | 10/1989 | Lott |
| 4,929,353 A | 5/1990 | Harris |
| 4,944,873 A | 7/1990 | Williams |
| 5,012,984 A | 5/1991 | Ishikawa et al. |
| 5,156,749 A | 10/1992 | Williams |
| 5,182,017 A | 1/1993 | Ippendorf |
| 5,183,086 A | 2/1993 | Fanta et al. |
| 5,478,209 A | 12/1995 | McDonough |
| 5,522,419 A | 6/1996 | Sand |
| 5,595,654 A | 1/1997 | Caughman, Jr. |
| 5,628,623 A | 5/1997 | Skaggs |
| 5,667,365 A | 9/1997 | Miller et al. |
| 5,681,460 A | 10/1997 | Caughman, Jr. |
| 5,707,535 A | 1/1998 | Harris |
| 5,776,567 A | 7/1998 | Schilling et al. |
| 5,785,846 A | 7/1998 | Barnes et al. |
| 5,811,013 A | 9/1998 | Ito |
| 5,858,226 A | 1/1999 | Caughman, Jr. |
| 5,957,665 A | 9/1999 | Kanzler et al. |
| 5,993,167 A | 11/1999 | Mochizuki |
| 6,004,461 A | 12/1999 | Harris |
| 6,017,195 A | 1/2000 | Skaggs |
| 6,074,549 A | 6/2000 | Bacon Cochrane et al. |
| 6,186,701 B1 | 2/2001 | Kempers |
| 6,187,209 B1 | 2/2001 | Shurtliff et al. |
| 6,258,268 B1 | 7/2001 | Lake |
| 6,322,327 B1 | 11/2001 | Dawson et al. |
| 6,364,122 B1 | 4/2002 | Massey |
| 6,450,775 B1 * | 9/2002 | Hutchinson et al. ........ 417/198 |
| 6,860,042 B1 * | 3/2005 | Hutchinson et al. .......... 37/322 |
| 6,911,145 B1 * | 6/2005 | Hutchinson et al. ........ 210/258 |
| 2004/0011749 A1 | 1/2004 | Hutchinson et al. |

FOREIGN PATENT DOCUMENTS

| | | |
|---|---|---|
| EP | 0178873 A1 | 4/1986 |
| GB | 122278 | 1/1919 |
| JP | 51140206 | 12/1976 |
| JP | 5442682 | 12/1979 |
| JP | 56159437 | 12/1981 |
| JP | 62223296 | 10/1987 |
| JP | 3151422 | 6/1991 |
| JP | 5245355 | 9/1993 |
| JP | 08028500 | 1/1996 |
| KR | 8900013 | 3/1989 |

* cited by examiner

APPARATUS AND METHODS FOR SEPARATING SLURRIED MATERIAL

REFERENCE TO RELATED APPLICATIONS

This application is a continuation of commonly owned and U.S. patent application Ser. No. 10/199,777, filed Jul. 19, 2002, now U.S. Pat. No. 6,911,145 the disclosure of which is incorporated herein by reference.

REFERENCE TO COMMONLY-OWNED APPLICATIONS

This application may be considered to have subject matter related to that of commonly owned and co-pending U.S. patent application Ser. No. 09/711,499 filed on Nov. 13, 2000 which is a continuation-in-part of U.S. patent application Ser. No. 09/482,995 now U.S. Pat. No. 6,322,327 B1, issued on Nov. 27, 2001, to commonly owned U.S. Patent Appl. No. 10/199,763 filed on Jul. 19, 2002, now U.S. Pat. No. 6,817,837, and to commonly owned U.S. Patent Appl. No. 10/199,764 filed on Jul. 19, 2002, now U.S. Pat. No. 6,860,042.

TECHNICAL FIELD

This invention relates to apparatus and methods for dewatering slurried material.

BACKGROUND

Many industries produce large amounts of solid-liquid mixtures or slurries as by-products or waste material. Slurries also occur naturally in various environments, such as in stream beds and lakes. Various devices have been employed to "de-water" or otherwise separate a liquid faction from a mixture of liquids and solids.

Vacuum-type systems, sometimes in conjunction with filter media, have been used in the past to accomplish a desired separation of the liquids from the slurry. In bulk operations when a constant liquid flow cannot be maintained by action of conventional vacuum pumps, the conventional pump will lose its prime or cavitate with a resulting loss of efficiency in pumping capability. Therefore a need exists for an efficient system of liquid-solid separation which can operate when the material pumped by the vacuum pump is made up of liquids, gases or solids or a mixture of two or more of these.

SUMMARY OF THE INVENTION

This invention is deemed to fulfill these and other needs by providing, among other things, an apparatus for separating liquid from a slurry of at least one liquid and at least one solid. An embodiment this apparatus comprises:
  (A) a container sized and configured to receive the slurry, the container comprising a removable cover sized and configured to enclose an atmosphere within the container when the cover is attached to the container;
  (B) a filter disposed within the container, for separating liquid in the slurry from solid material in the slurry by allowing liquid to move through the filter as filtrate; and
  (C) a vacuum pump in fluid communication with the enclosed atmosphere of the container, which pump is configured to create a vacuum within the container that causes the liquid to move through the filter, and which pump is configured to vacuum material comprised of solid material, liquid material, gas or a combination of two or more of the foregoing while maintaining a substantially continuous level of vacuum.

An embodiment of the apparatus the pump comprises:
  (a) a nozzle assembly which is sized and configured to (i) receive a pressurized motive liquid and a gas, and (ii) eject the pressurized motive liquid as a motive liquid flow while feeding the gas into proximity with the periphery of the motive liquid flow;
  (b) a housing defining a suction chamber into which the nozzle assembly may eject the motive liquid flow, the housing further defining a suction inlet and a suction outlet;
  (c) an outlet pipe extending from the suction outlet away from the suction chamber, the outlet pipe being configured for fluid communication with the suction chamber and being disposed to receive the motive liquid flow; the outlet pipe defining at least a first inner diameter along a portion of its length and a second inner diameter along another portion of its length, the second inner diameter being less than the first inner diameter; and
  (d) a suction pipe, a first end of the suction pipe opening into the suction chamber at the suction inlet, and a second end of the suction pipe in fluid communication with the enclosed atmosphere of the container.

Another embodiment of the invention comprises a method for separating liquid from a slurry comprised of a mixture of at least one solid and at least one liquid. The method comprises:
  (A) placing a filter within a container wherein the container has a removable cover sized and configured to substantially enclose an atmosphere within the container when the cover is attached to the container;
  (B) placing the slurry into the container;
  (C) creating a vacuum within the container by operation of a vacuum pump, which pump is configured to effectively vacuum material which comprises solid material, liquid material, gas or a combination of two or more or the foregoing while maintaining a substantially continuous level of vacuum, and wherein the pump is in fluid communication with the enclosed atmosphere of the container; and
  (D) separating the filtrate from the slurry by drawing the filtrate through the filter by vacuum action of the pump.

The step of the method for creating the vacuum within the container further comprises:
  (a) injecting a pressurized liquid into a nozzle assembly of the pump to produce a flow of pressurized liquid;
  (b) providing a gas to said nozzle assembly to surround the flow of pressurized liquid with the gas; and
  (c) directing the flow of pressurized liquid surrounded by the gas into a suction chamber in fluid communication with a first end of a suction pipe and an outlet pipe, the outlet pipe defining a venturi-like inner surface, and directing the flow of pressurized liquid surrounded by the gas toward the outlet pipe to produce a vacuum at a second end of the suction pipe, which second end of the suction pipe is in fluid communication with the enclosed atmosphere of the container.

An embodiment of the method of the invention further comprises conveying the filtrate into (I) the motive liquid flow of the pump or (II) a collection tank located in series between the pump and the container, which collection tank is in fluid communication with the enclosed atmosphere of the container.

These and other embodiments and features of the invention will become still further apparent from the ensuing drawings, description and appended claims.

BRIEF DESCRIPTION OF THE DRAWINGS

In each of the above figures, like numerals are used to refer to like or functionally like parts among the several figures.

DETAILED DESCRIPTION OF THE INVENTION

Figure 1:
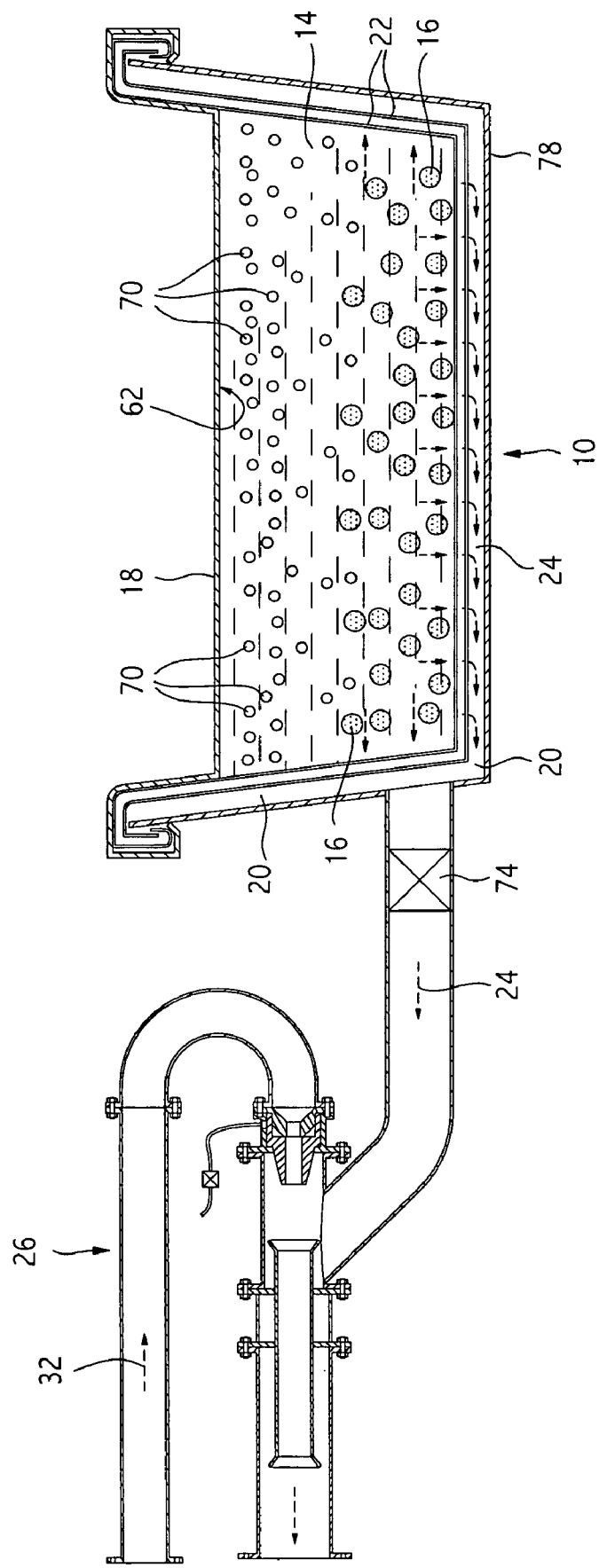
FIG. 1 is a sectional view of an apparatus embodiment of this invention.

As will now be appreciated, the present invention enables highly efficient separation of a liquid from solids of a slurry. An embodiment of the invention which separates liquid from a slurry of at least one liquid and at least one solid may be seen in FIG. 1. The apparatus comprises a container 10 sized and configured to receive slurry 12. Container 10 is herein depicted as a roll-off container, but it can be any suitably sized and structured container such as, but not limited to, tanks, boxes, dumpsters, dump truck beds, drums and hoppers. Container 10 need be no set shape, size or form but preferably will hold a suitable amount of slurried material for the particular application. Container 10 comprises a removable cover 18 sized and configured to enclose an atmosphere within container 10 when cover 18 is attached. In a preferred embodiment, cover 18 comprises a flexible, non-porous material capable of substantially conforming to upper level 62 of slurry 12. The term non-porous, as used herein means sufficiently impervious to gas, liquid, or solid to provide the substantially sealed volume or enclosed atmosphere required to form a sufficient vacuum in the container. Suitable materials for cover 18 can be, but are not limited to, plastic, MYLAR®, metal foil sheeting, tightly woven material where the threads are liquid-impermeable, and visqueen. Of these, visqueen is a preferred material for cover 18. By substantially conforming to the upper level of slurry 12, cover 18 can serve the additional function of allowing the operator to judge the progress of the filling operation when slurry 12 is received by container 10. Cover 18 can be removed to permit filling and emptying of container 10.

Filter 22 is disposed within container 10 so that filter 22 substantially conforms to the shape of container 10, but so that a space 20, preferably in the range of about 1.5 to 4 inches, is formed between the exterior wall 78 of container 10 and filter 22. During and after reception of slurry 12 into container 10, liquid 14 moves through filter 22. For clarity, liquid 14, after passage through filter 22 is characterized as filtrate 24.

When cover 18 is securely attached to container 10, container 10 and cover 18 define an enclosed atmosphere. This enclosed atmosphere is the gas, liquid and/or solid material in the space defined by cover 18 and exterior wall 78 of container 10.

Figure 2A:
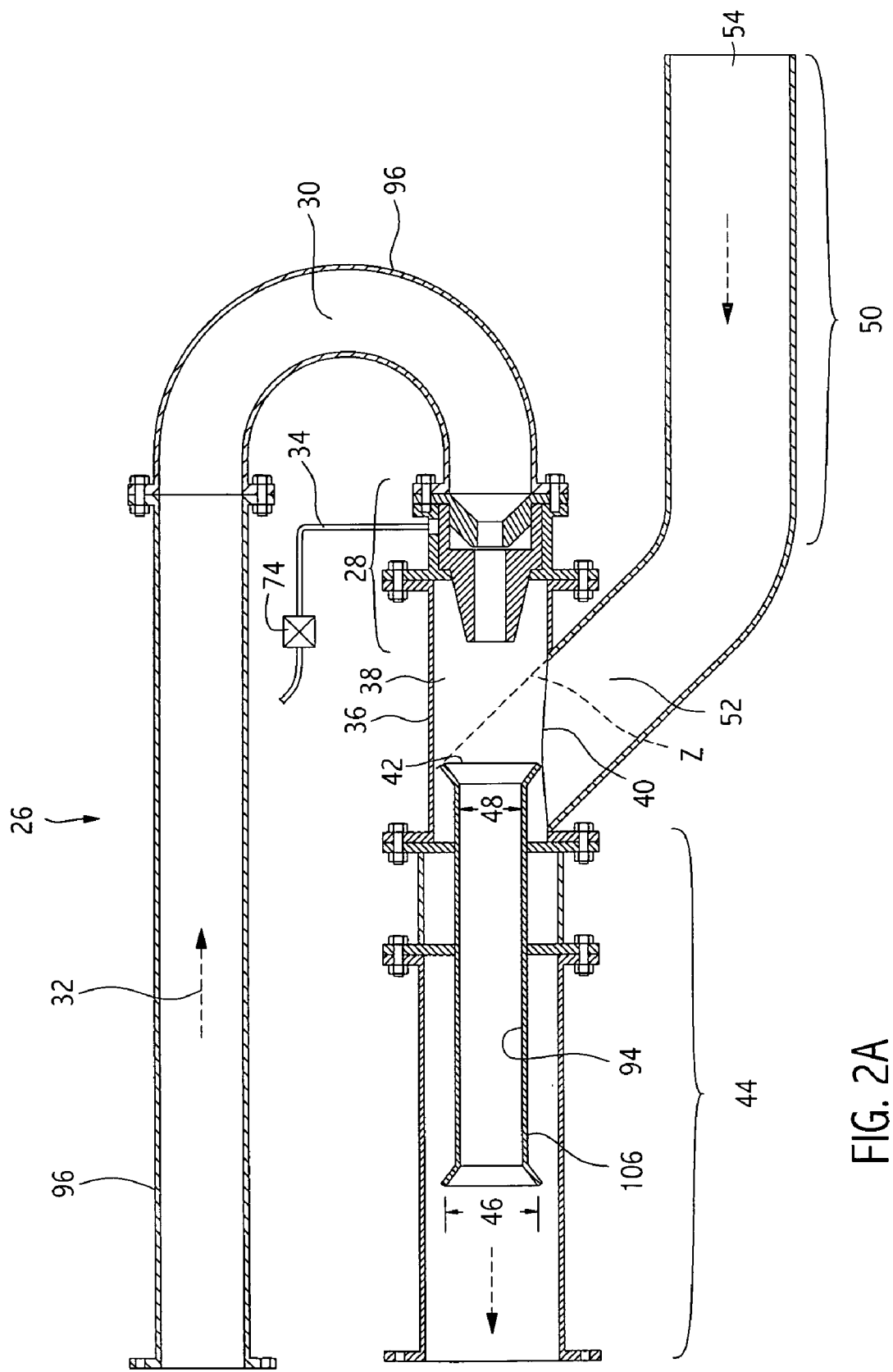
FIG. 2A is a sectional view of the vacuum pump component of the apparatus of FIG. 1.
Figure 2B:
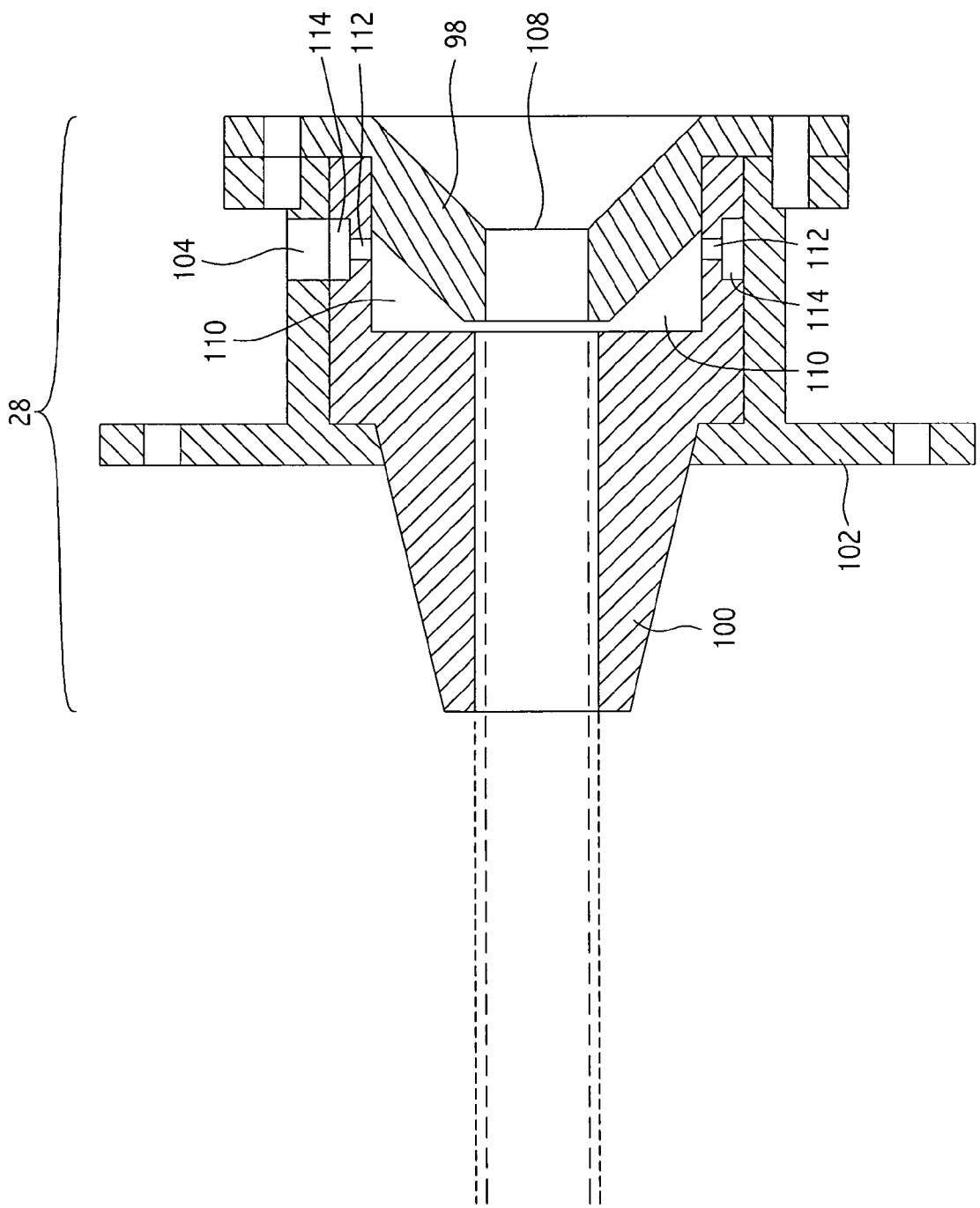
FIG. 2B is a sectional view of the nozzle assembly of a jet pump of the apparatus of FIG. 2A.

Action of a vacuum pump in fluid communication with the enclosed atmosphere of container 10 creates a vacuum within container 10 that causes liquid 14 to move rapidly and efficiently through filter 22. The vacuum pump is configured to vacuum material comprised of solid material, liquid material, gas or a combination or mixture of any two or more of these while maintaining a substantially continuous level of vacuum. In one embodiment of the invention, jet pump 26, as depicted in FIGS. 1, 2A and 2B, is capable of maintaining a substantially continuous level of vacuum regardless of the makeup of the pumped material without cavitation or loss of prime. By substantially continuous level of vacuum it is meant that there is no significant deviation from the level of vacuum, even if the pumped material contains large volumes of air or other gases. In one embodiment of the invention jet pump 26 comprises the jet pump described in our U.S. Pat. No. 6,322,327 B1 and pending U.S. application Ser. No. 09/482,995, which is incorporated herein by reference.

FIG. 1 depicts an embodiment of the invention where slurry 12 comprises liquid 14, gas 70, and solids 16. Preferably, liquid 14 will be caused to move through filter 22, to form filtrate 24, which in turn is brought into space 20, and then out of container 10. This movement of filtrate 24 through filter 22 can either be along the bottom or sides of filter 22. In the preferred depicted embodiment, a valve 74 is provided for controlling flow of filtrate 24 out of container 10 and also for controlling fluid communication between jet pump 26 and container 10. As depicted in FIGS. 1 and 2A, filtrate 24 is drawn through valve 74 upon operation of jet pump 26 and into the motive fluid flow of jet pump 26.

As may be seen in an embodiment of the invention shown in FIG. 2A, a inlet pipe 96 feeds water or other liquid as a pressurized motive fluid 30, pumped by a conventional-type pump (not shown) to jet pump 26. Typically, this conventional-type pump is a centrifugal pump, but it can be any pumping means, such as a positive displacement pump or even another jet pump.

FIG. 2B illustrates nozzle assembly 28 of jet pump 26 in greater detail. Jet pump 26 includes nozzle assembly 28, which in turn is comprised of a fluid nozzle 98, an air injection nozzle 100 and a nozzle housing 102. Nozzle housing 102 is a flanged member which is attached to and maintains the proper position of fluid nozzle 98 adjacent to air injection nozzle 100. Air intake 104 is one or more passages through nozzle housing 102. In the embodiment depicted, a single air intake 104 is shown although those skilled in the art could use more. A gas conduit in the form of an air hose 34, shown only in FIG. 2A, provides a gas to jet pump 26 and allows jet pump 26 to use air even when below the water level.

As may be seen from FIGS. 2A and 2B, motive fluid 30, supplied by a pumping means passes in a motive fluid flow 32 through inlet pipe 96, fluid nozzle 98, and air injection nozzle 100 into a housing 36 which defines a suction chamber 38. In suction chamber 38, the fluid in the form of a liquid flow combines with material entering from suction pipe 50, and the combined stream enters an outlet pipe 44 having a target tube 106. The material entering from suction pipe 50 can be predominately filtrate 24 or, in another embodiment of the invention, can be predominately gas such as air with little or no liquid or solid content. The combined stream then passes through target tube 106 into outlet pipe 44.

Referring to FIG. 2B, in the interior of nozzle housing 102, fluid nozzle 98 includes constricted throat 108. Fluid nozzle 98 is attached by a connecting means to air injection nozzle 100. Air gap 110 exists between constricted throat 108 and air injection nozzle 100. In one embodiment, air gap 110 between constricted throat 108 and air injection nozzle 100 at its narrowest point measures 3/16 of an inch. The overall area and dimension at the narrowest point of air gap 110 will vary with the application and the material being transferred to optimize the suction effect.

Constricted throat 108 is attached to air injection nozzle 100 by means of nozzle housing 102. Nozzle housing 102 is a flanged pipe with air intake 104 drilled into the pipe circumference. Although nozzle housing 102 is depicted with one air intake 104, those skilled in the art would know that multiple air intakes can be provided. Air injection nozzle 100 is provided with one or more air holes 112.

When air injection nozzle 100 and fluid nozzle 98 are assembled, one of air holes 112 can align with air intake 104. Alignment however is not necessary, as air injection nozzle 100 further defines an annular trough 114 in its outer surface into which air holes 112 open, thereby providing a path for air flow around the circumference of nozzle 100 and into each of holes 112.

Air hole 112 and air intake 104 allow the entry of atmospheric air to fill air gap 110. The forced delivery of liquid through constricted throat 108 creates a vacuum in air gap 110 that pulls in atmospheric air. Varying the amount of air entering air hole 112 creates an increased or decreased suction effect in air gap 110.

In one embodiment, vacuum in air gap 110 measures 29 inches of Hg when air intake 104 is 10% open, compared to 10 inches of Hg when air intake 104 is 100% open. Restriction of air through air intake 104 can be accomplished by any mechanical valve means, e.g., such as that depicted in FIG. 1 as valve 74.

Without being bound to theory, it is believed that entry of a gas (e.g., air) into air gap 110 creates a gas bearing effect as may be seen in FIG. 2B. The air surrounds the flow of fluid leaving constricted throat 108 and the combined fluid jet with surrounding air passes through air injection nozzle 100.

Referring to FIGS. 2A and 2B, the fluid jet with the air, introduced through air gap 110, exits air injection nozzle 100, passes through suction chamber 38, and enters target tube 106. The combined air fluid jet passes through suction chamber 38 with minimal deflection before entering target tube 106.

Referring to FIG. 2A, suction chamber 38 is shown with a first end 52 of suction pipe 50 entering suction inlet 40 at a 45° angle. The angle of entry of suction pipe 50 can be in the range of about 30° to about 90° with 45° preferred in embodiment of the invention of FIGS. 1 and 2A. The design of suction chamber 38 allows one to adjust the placement of air injection nozzle 100 so that air injection nozzle 100 is out of the flow of material entering suction chamber 38, so as to prevent wear, or further into suction chamber 38 and into the imaginary line of flow Z of suction pipe 50 so as to create a greater vacuum. Thus, it is to be understood that the nozzle assembly 28 and particularly air injection nozzle 100 can be extended into suction chamber 38 towards suction outlet 42 and into the imaginary line of flow Z of suction pipe 50.

Target tube 106 constitutes a segment of the outlet pipe in the form of a detachable wear plate in the preferred embodiment illustrated. The outlet pipe segment defines an inner surface 94, at least a portion of which in turn defines the second inner diameter of the outlet pipe. The target tube can be detached from outlet pipe 44 and suction chamber 38. The majority of wear from abrasive material occurs in target tube 106, not suction chamber 38, because of reduced cavitation from the air bearing effect on the liquid jet and the design of suction chamber 38.

Target tube 106 can vary in both length and diameter. Diameter will most often be determined by the character of the material conveyed. Length and diameter of target tube 106 will effect the distance and head pressure that jet pump 26 can generate. In an embodiment shown in FIG. 2A, target tube 106 could have angled edges 46 of a larger diameter than the diameter of the target tube body 48 at one or both ends of target tube 106.

In a preferred embodiment, the nozzle elements of FIG. 2A are constructed according to specific proportions. Although the nozzle elements are shown as three separate elements, those skilled in the art would know that the nozzle assembly could be constructed of one or more elements of varying dimensions. Fluid nozzle 98 is 5 inches in length and 8 inches in outer diameter. Constricted throat 108 of fluid nozzle 98 at its inner edge narrows radially inward from 8 inches to 2 inches diameter at its narrowest point at a 45° angle. Constricted throat 108 measures 3 inches in diameter on its outer edge.

Dimensions of air injection nozzle 100 for a preferred embodiment of the invention can be as follows. Air injection nozzle 100 is 12⅞ inches in length. At one end, air injection nozzle 100 is 10 inches in diameter on its outside surface, and 8.01 inches in diameter on its inside surface. The outside surface remains 10 inches in diameter axially for a length of 5 inches, then drops radially to a diameter of 7 inches, and angles inward radially to a diameter of 4 inches for the remaining length. In a preferred embodiment, air injection nozzle 100 has an angle of 102° between the smallest diameter at angled end in the vertical plane and angled edge. The inside surface of air injection nozzle 100 remains 8.01 inches axially for a length of 4 3/16 inches, then drops radially to a diameter of 2½ inches for the remainder of the length.

In a preferred embodiment, nozzle housing 102 measures 13½ inches at its flanged end connected to fluid nozzle 98. At its flanged end, connected to suction chamber 38, the outer diameter measures 19 inches and an inner diameter measuring 7.0625 inches, sufficient to allow passage of air injection nozzle 100 at its angled end. The flanged end of nozzle housing 102 has an inner diameter for the remaining length of 10.01 inches to accommodate air injection nozzle 100 at its largest point. Nozzle housing 102 has a 1 inch NPT connection in air intake 104.

While it is understood that at least one preferred jet pump described herein is characterized by the entry of atmospheric air and a detachable outlet pipe segment forming a wear plate, it is apparent that the foregoing description of specific embodiments can be readily adapted for various applications without departing from the general concept or spirit of this invention. Thus, for example, the inner surface of the outlet pipe (which provides the venturi effect feature of the outlet pipe) alternatively can be defined by the pipe itself, rather than a detachable wear plate, and/or the gas entering the nozzle assembly can be an inert gas, e.g., nitrogen.

These and other adaptions and modifications are intended to be comprehended within the range of equivalents of the presently disclosed embodiments so that jet pump 26 is capable of maintaining a significant suction effect in gaseous or liquid environments. Terminology used herein is for the purpose of description and not limitation.

The dimensions of the various component parts of jet pump 26 may vary depending upon the circumstances in which jet pump 26 will be employed, so long as the dimensions permit the components to function as described herein. Except where specifically noted otherwise herein, the component parts may be fabricated from a wide variety of materials, the selection of which will depend again upon the circumstances in which jet pump 26 will be employed. Preferably, metals, metal alloys or resilient plastics, for example, will be employed to insure that points of mechanical contact or abrasive wear in the systems and pumps will be resilient enough to withstand the forces placed upon them during pump operation.

Filter 22 is chosen for a particular application so that no significant amount of solid 16 of slurry 12 is able to move through filter 22, thus accomplishing the desired separation of components of slurry 12. In an embodiment of the invention shown best in FIGS. 1, and 3 filter 22 is comprised of a first filter element 58 and a second filter element 60. First filter element 58 can be a material such as metal screen or perforated metal sheet, that can be removably or permanently attached to the interior of container 10. Though depicted in FIGS. 1, and 3 as being disposed within container 10 so as to effectively cover the bottom and side walls, first filter element 58 may be disposed only along the bottom of container 10. Second filter element 60 can be any suitable filter media such as the non-limiting examples of felt and/or woven or non-woven geotextiles, such as those produced by Amoco Fabrics and Fibers Company of Atlanta, Ga. The choice of filter media is determined by the characteristics of slurry 12 so that optimal separation of liquid 14 can be achieved. The metal screen can have a pore size in the range of about 0.125 to about 0.25 inches and the filter media can have a pore size in the range of about 0.02 to about 0.06 inches.

Container 10 can be additionally configured to serve as a storage container for storing either the slurry, the filtered solid, or both and can be configured to serve as a transport container for transporting either the slurry, the filtered solid or both.

Figure 3:
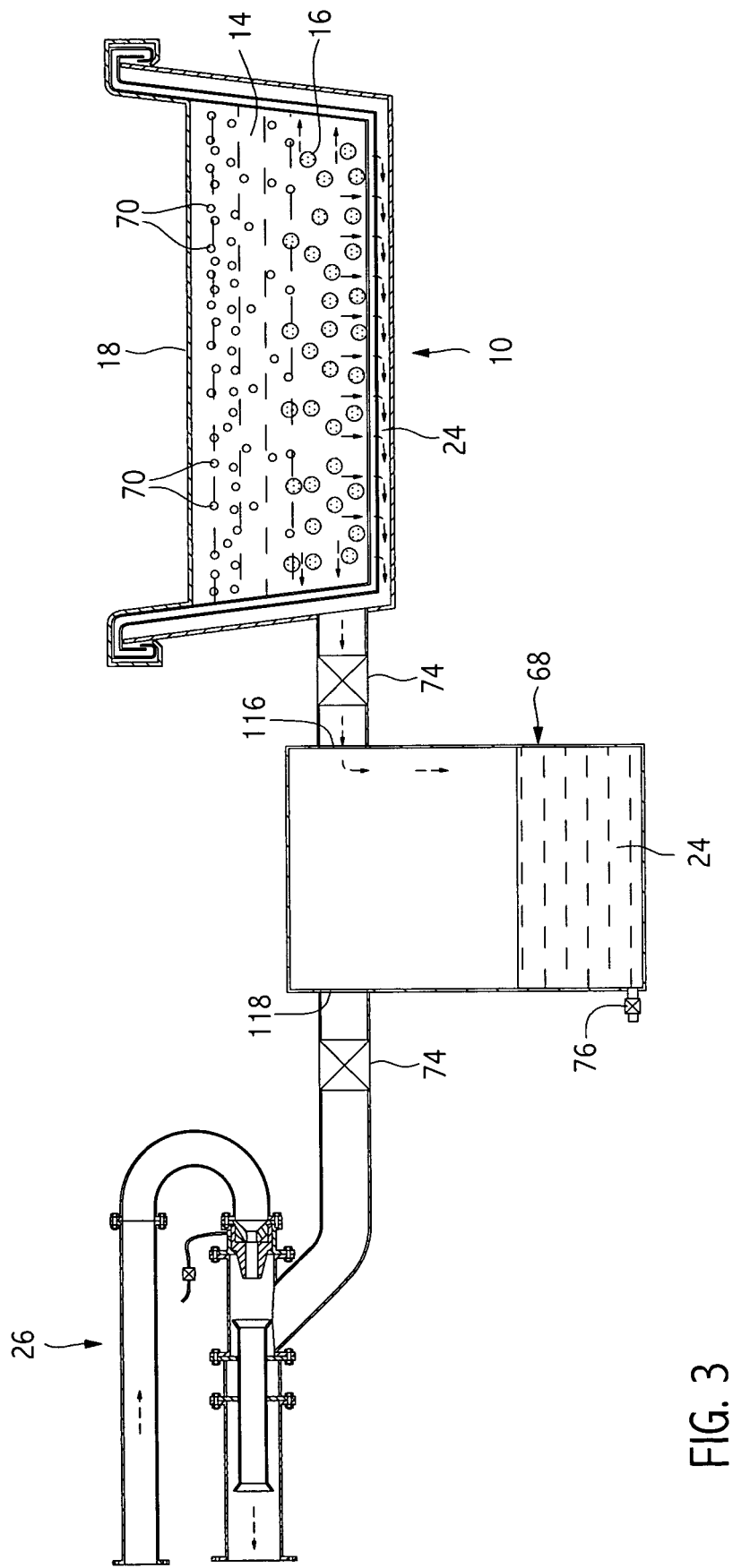
FIG. 3 is a sectional view of an apparatus embodiment of this invention showing a relationship of the collection tank to the pump and container.

An embodiment of the invention for separating liquid 14 from slurry 12 is shown in FIG. 3, where configuration and features of container 10, filter 22, and jet pump 26 are consistent with the foregoing discussion. In this embodiment the apparatus additionally comprises a collection tank 68 in fluid communication with both the enclosed atmosphere of container 10 and with jet pump 26. Collection tank 68, as depicted in this embodiment of the invention, is located between container 10 and jet pump 26 so that liquid 14 is drawn through filter 22 into space 20 to become filtrate 24 by vacuum action of jet pump 26.

Collection tank 68 comprises at least one inlet 116, at least one outlet 118, and at least one drain 76. Operation of jet pump 26 causes a vacuum to be formed at the second end 54 of suction pipe 50 which second end 54 in fluid communication with outlet 118 of collection tank 68. This vacuum causes filtrate to be drawn quickly and efficiently through collection tank inlet 116 which is in fluid communication with the enclosed atmosphere of container 10. Filtrate typically enters collection tank inlet 116 and collects at the bottom of collection tank 68. Periodically, vacuum operation of jet pump 26 is halted, valve 74 in line between jet pump 26 and collection tank outlet 118, and valve 74 between collection tank inlet 116 and container 10 are closed, and drain 76 is opened to remove any collected filtrate. Removal of filtrate through drain 76 can be assisted by the use of pumping means (not shown) which means can include any conventional type pump or a jet pump as described above. In a particularly preferred embodiment, the pump used recycled motive fluid as in our commonly-owned U.S. patent application Ser. No. 10/199,763 filed on Jul. 19, 2002, now U.S. Pat. No. 6,817,837. This latter configuration is preferred when it is desirable to keep filtrate 24 separate from the motive liquid flow 30 of jet pump 26. Such applications might include, but are not limited to, de-watering of slurry which is contaminated with a hazardous liquid or volatile which requires special segregation and storage of filtrate after separation.

Figure 4:
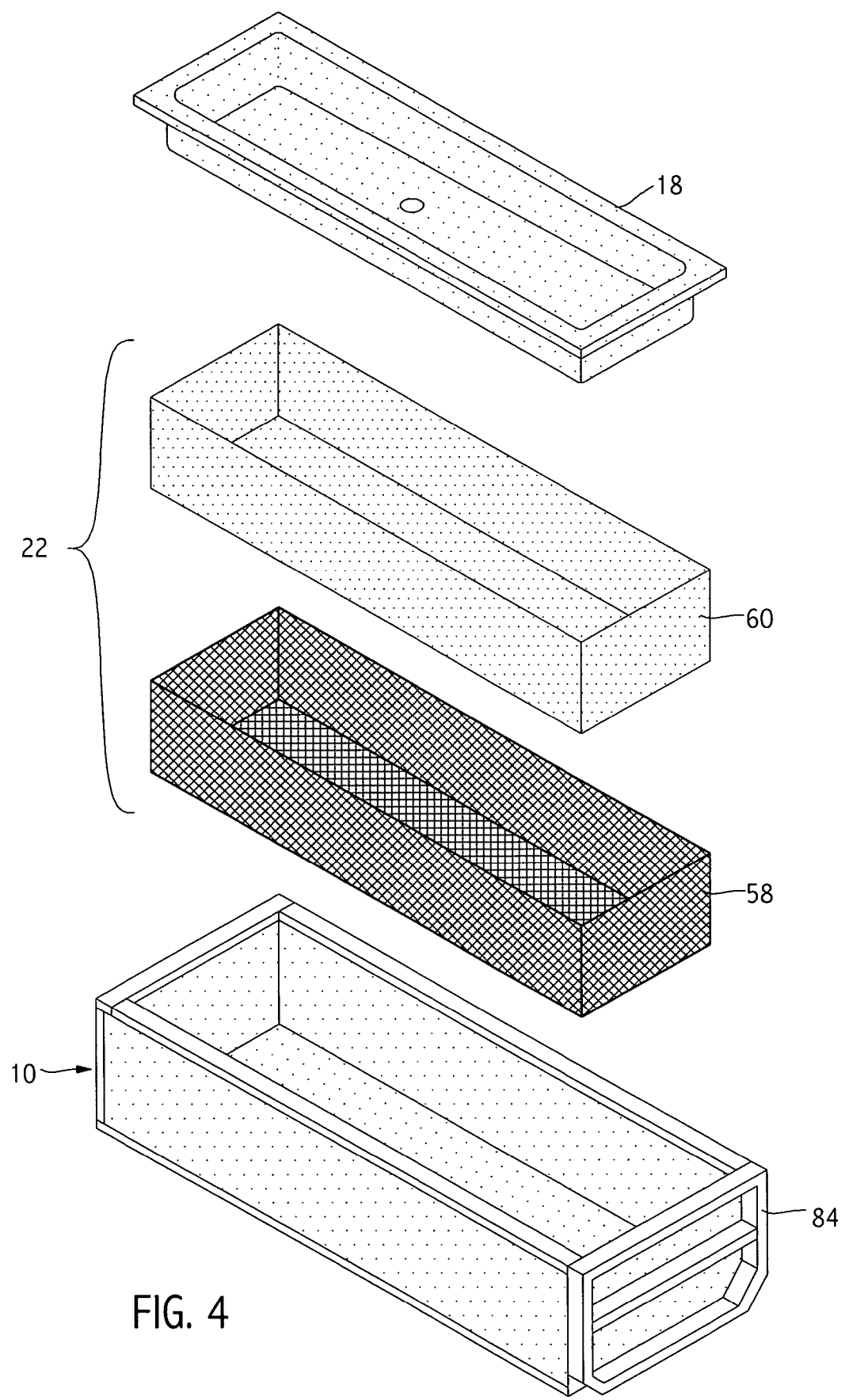
FIG. 4 is an exploded view in perspective of the container of an apparatus embodiment of this invention.
Figure 5:
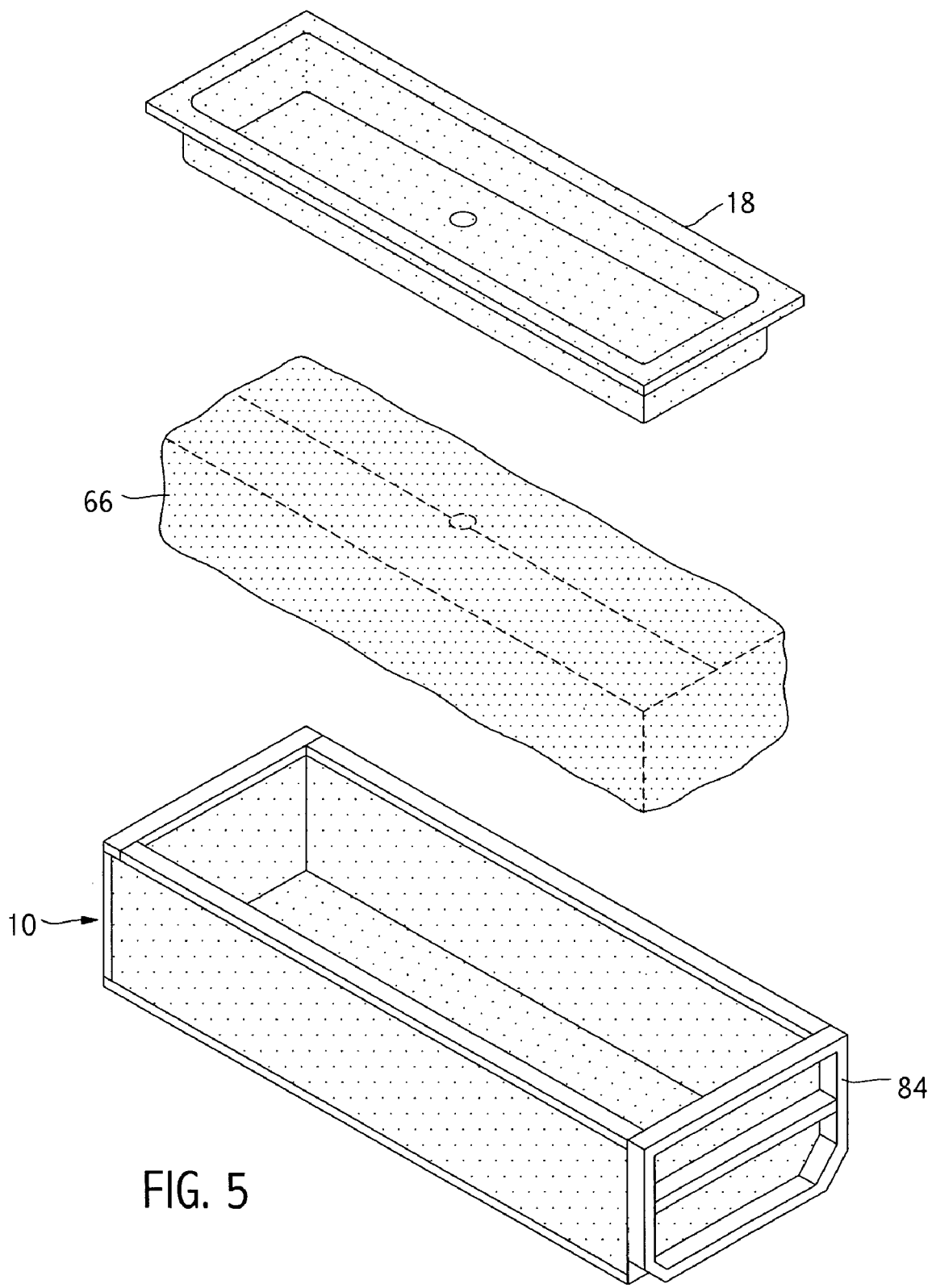
FIG. 5 is an exploded view in perspective of the container of an apparatus embodiment of this invention.
Figure 8:
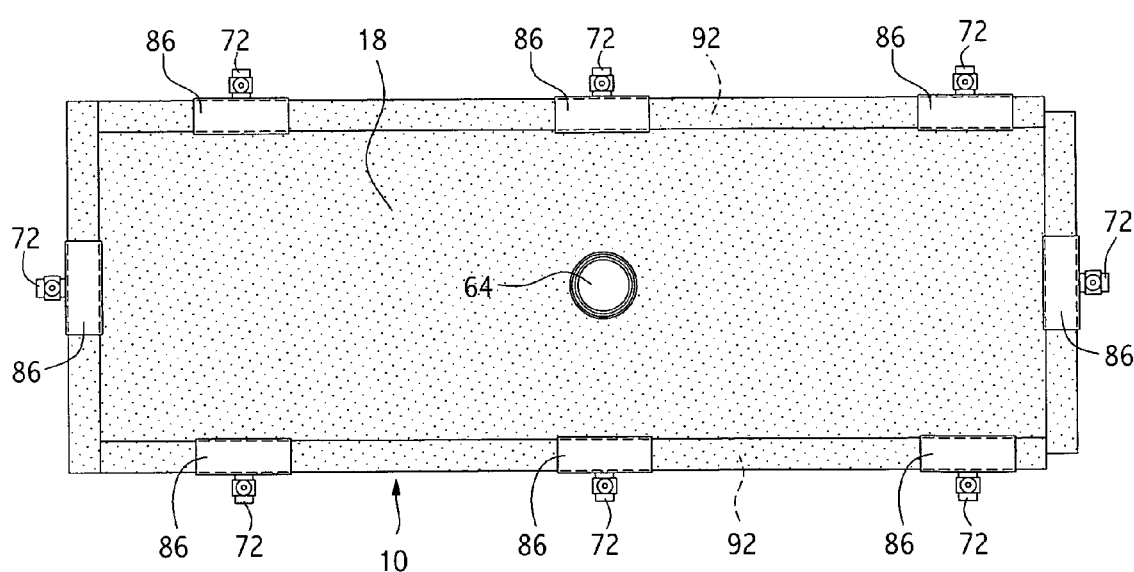
FIG. 8 is a top view of an apparatus embodiment of the container of this invention.

In an embodiment of FIG. 4, filter 22 comprises a filter bag 66 which is disposed within container 10 so as to permit slurry 12 to be received into filter bag 66. Once filter bag 66 is substantially filled with slurry 12, cover 18 is securely attached to a top edge 92 of container 10 (as seen in FIG. 8) so that the enclosed atmosphere is formed within container 10. Vacuum action to draw filtrate through filter bag 66 and into space 20 can then proceed as previously described. Filter bag 66 can be comprised of a liquid permeable material. This material may, for example, be either a porous woven or porous non-woven material. One source of such filter bags capable of holding bulk amounts of slurry is Ten Cate Nicolon, Pendergrass, Ga. Use of such filter bags makes emptying of container 10 easier, since solids 16 will be contained with filter bag 66. Filter bag 66 can be removed by any appropriate means from container 10 with solids 16 inside and transported for ultimate disposal at another location.

Container 10 can be emptied by removing cover 18. If container 10 comprises a roll-off container, as shown in FIGS. 4–8 as having wheels 80,80, removal of solids 16 after de-watering can be accomplished by opening hinged end 84 of container 10 as shown best in FIG. 7. Hinged end 84 is capable of closing tightly enough to provide a suitable enclosed atmosphere of this invention.

Figure 6:
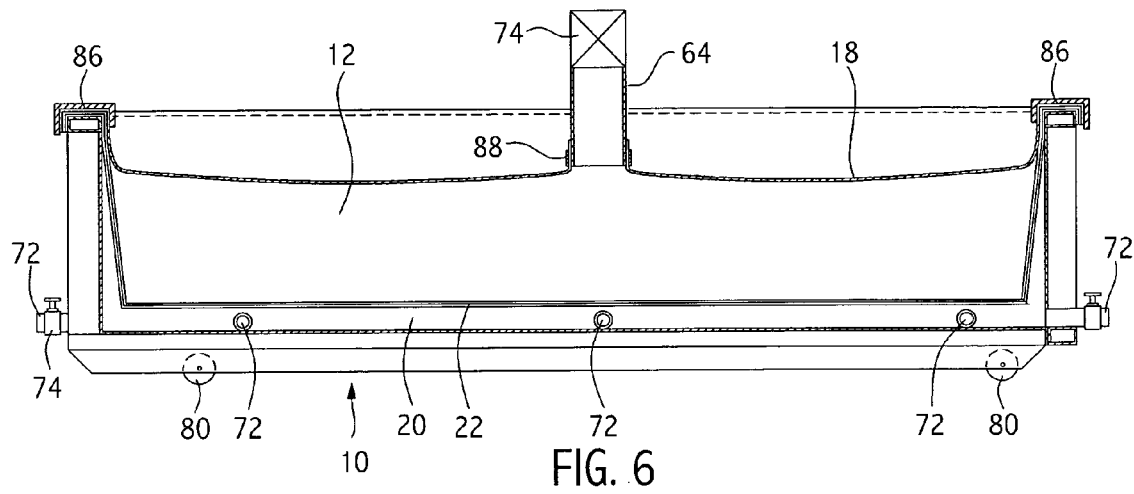
FIG. 6 is a sectional view of an apparatus embodiment of this invention showing the relationship of the access port of the cover and the outlet ports to the container.

In the embodiment depicted in FIGS. 6–9, cover 18 comprises a flexible non-porous material capable of substantially conforming to upper level 62 of slurry 12. During creation of a vacuum within the enclosed atmosphere, cover 18 will typically move toward the bottom of container 10 as liquid 14 removal progresses and this movement of cover 18 serves to additionally aid in the separation process by pressing on the upper surface of slurry 12. Cover 18 can also comprise at least one closeable access port 64 sized and configured to either receive slurry into container 10 or close during provision of the enclosed atmosphere. In a preferred alternative embodiment, access port 64 can remain open or partially open during operation of jet pump 26 so that slurry 12 can be loaded into container 10 while liquid 14 is being drawn off in a substantially continuous process. Means for closing access port 64 can be a gate valve such as valve 74, shown in FIG. 6, but other closing means are within the scope of this invention. Access port 64 as depicted extends through cover 18, into the interior of container 10. Access port 64 can be constructed of any suitable material which is rigid enough during the movement of slurry into container 10 to provide a non-collapsing access way. Cover 18 is shown in FIG. 6 as being sealed at band 88 so that, with valve 74 closed, an enclosed atmosphere can be produced to allow swift and efficient separation of liquid 14 from slurry 12, using the vacuum produced by jet pump 26 (not shown). Band 88 is only one possible means for producing a seal between access port 64 and cover 18. Other means might include but are not limited to clamps, wire and VELCRO®.

Attachment between cover 18 and container 10 should be sufficiently tight to permit formation of the necessary enclosed atmosphere. Such attachment for one embodiment of the invention is best seen by referring to FIGS. 6, 8 and 9. Sections of U-shaped metal, depicted as channel 86 in the figures, are placed over the outer edge of cover 18 as it is stretched over top edge 92 of container 10. The number of segments of channel 86 used depends on the type of material used for cover 18 and the degree of sealing necessary between cover 18 and container 10 to accomplish provision of the enclosed atmosphere. Other attachment means can be used other than channel, such as, but not limited to VEL-CRO®, snaps, and clamps.

Figure 9:
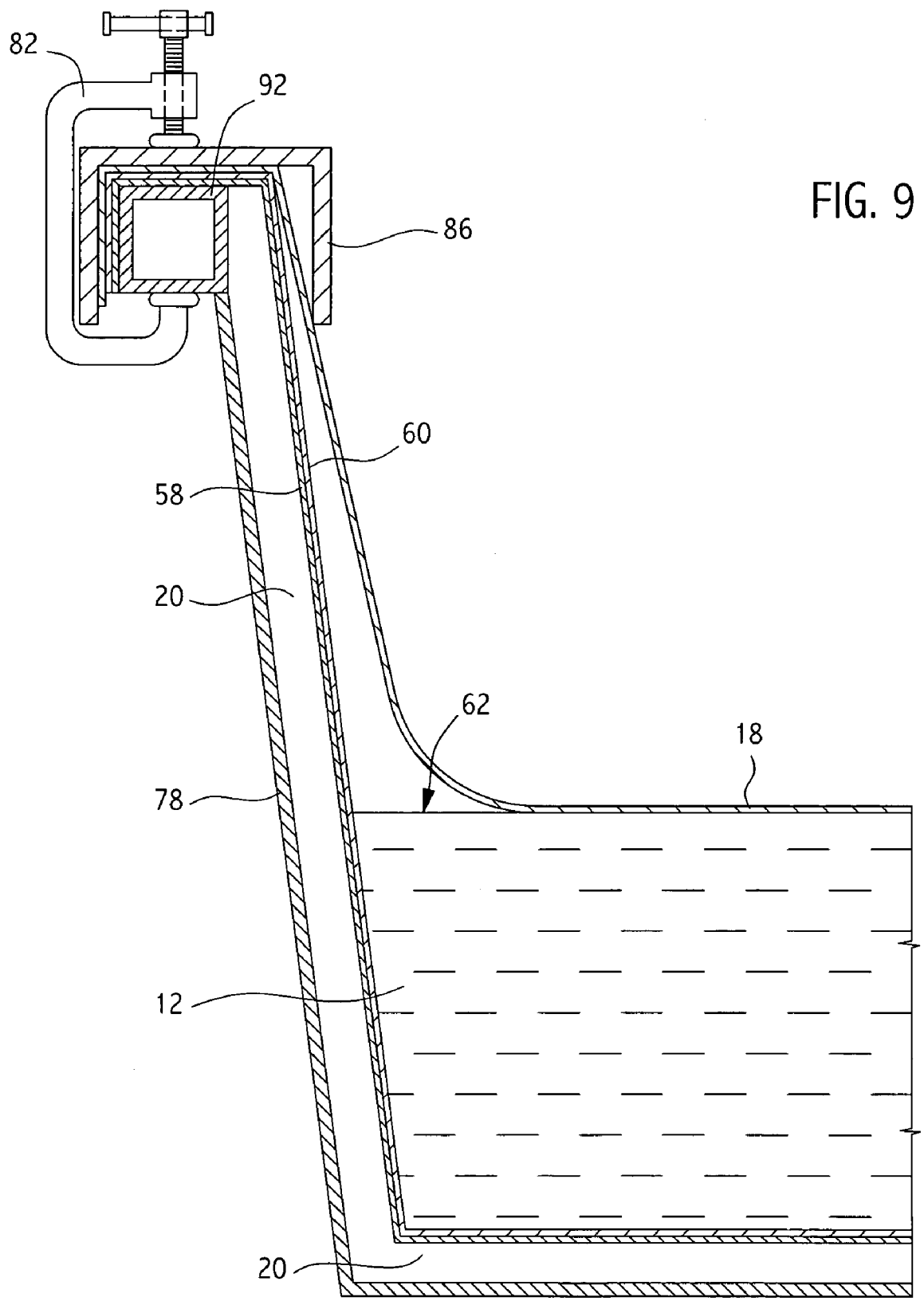
FIG. 9 is a partial sectional view of the an apparatus embodiment of the container of this invention.

FIG. 9 depicts an embodiment of the invention where circumstance dictates the need to secure cover 18 even more tightly to top edge 92 of container 10. This is accomplished by using C-clamp 82 to compress cover 18 between channel 86 and top edge 92, as shown.

Figure 7:
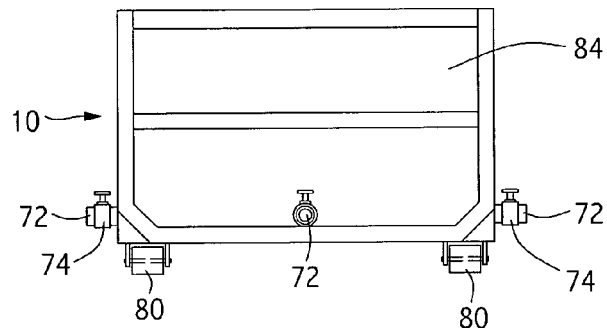
FIG. 7 is a sectional end view of an apparatus embodiment of the container of this invention.

An embodiment can be seen in FIGS. 6, 7, and 8 where container 10 comprises a plurality of outlet ports 72, 72 disposed around container 10. Outlet ports 72, 72 are sized and configured to be in fluid communication with the enclosed atmosphere of container 10. In the embodiment shown, outlet ports 72, 72 are in fluid communication with space 20 of container 10. At least one outlet port 72 is equipped with a valve 72 which allows control of fluid through outlet port 72.

One or more outlet ports 72,72 can be put into fluid communication with suction pipe 50 of jet pump 26 or in an alternative embodiment, outlet ports 72,72 can be put into fluid communication with collection tank inlet 116.

Figure 10:
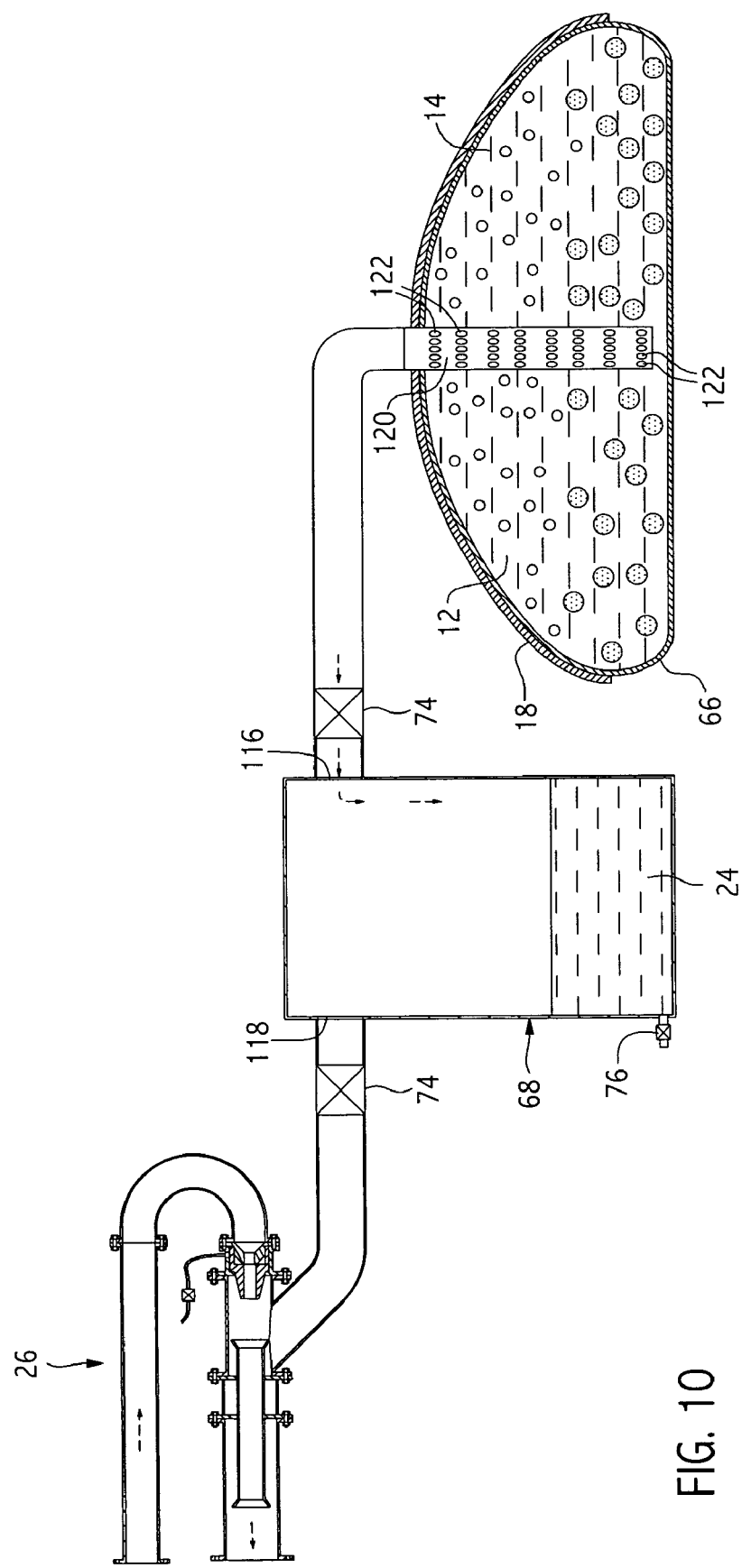
FIG. 10 is a sectional view of an embodiment of the invention.

In another embodiment of this invention illustrated in FIG. 10, components of slurry 12 are separated in an alternative container comprised of a filter bag 66, which may be filled or partially filled with slurry 12. Bag 66 may be in a separate rigid container or simply be placed on the ground in its unsupported form. A filter wand 120 in the form of an elongated hollow tube defining a plurality of openings 122 and having a closed end which extends into bag 66 and an open end which is in fluid communication with collection tank 68. When jet pump 26 operates to create a vacuum within collection tank 68, a vacuum is also created at openings 122 of filter wand 120. This vacuum causes liquid 14 to be drawn through openings 122 to become filtrate 24 and pass into collection tank 68. Once there, filtrate 24 may be handled as described herein.

As shown in FIG. 10, it is particularly preferred that cover 18 is draped over bag 66 to provide a partially enclosed atmosphere within bag 66. It will be appreciated that filter wand 120 can be inserted into any appropriate slurry container for separating liquid therefrom. However, this preferred embodiment which employs filter bag 66 without a supporting exterior container permits liquid to seep from filter bag 66 while filter wand 120 simultaneously removes liquid from the contents of bag 66. The sizing of openings 122 will dictate the amount and particle size of solids which remain in filtrate 24. The use of a particular sizing will be determined at least in part by the nature of the material to be filtered.

It will be appreciated that the embodiment of FIG. 10 may be comprised of a plurality of filter wands in fluid communication with the same or different collection tanks or the same or different jet pumps. By using a plurality of filter wands, larger filter bags containing greater amounts of slurry may be de-watered effectively.

As used herein the phrase "put into fluid communication with" signifies that some means of connecting the designated elements is employed, such as tube, lines, conduit, pipes, manifolds or the like, as long as fluid can pass between the designated elements.

Each and every patent, publication, or commonly-owned patent application referred to in any portion of this specification is incorporated in toto into this disclosure by reference, as if fully set forth herein.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A method for separating liquid from a slurry comprised of a mixture of at least one solid and at least one liquid which method comprises:
   (A) placing a filter within a container wherein the container has a removable cover sized and configured to substantially enclose an atmosphere within the container when the cover is attached to the container;
   (B) placing the slurry into the container;
   (C) creating a vacuum within the container by operation of a vacuum pump, which pump is configured to effectively vacuum material which comprises solid material, liquid material, gas or a combination of two or more of the foregoing while maintaining a substantially continuous level of vacuum, wherein the pump is in fluid communication with the enclosed atmosphere of the container; and wherein the pump functions at least by:
   (a) injecting a pressurized liquid into a nozzle assembly of the pump to produce a flow of pressurized liquid;
   (b) providing a gas to said nozzle assembly to surround the flow of pressurized liquid with the gas; and
   (c) directing the flow of pressurized liquid surrounded by the gas into a suction chamber in fluid communication with a first end of a suction pipe and an outlet pipe, the outlet pipe defining a venturi-like inner surface, and directing the flow of pressurized liquid surrounded by the gas toward the outlet pipe to produce a vacuum at a second end of the suction pipe, which second end of the suction pipe is in fluid communication with the enclosed atmosphere of the container; and
   (D) separating a filtrate from the slurry by drawing the filtrate through the filter by vacuum action of the pump.

2. A method according to claim 1 which further comprises:
   (E) conveying the filtrate into (I) the pressurized liquid or (II) a collection tank located in series between the pump and the container, which collection tank is in fluid communication with the enclosed atmosphere of the container.

3. A method according to claim 2 wherein the container further comprises a plurality of outlet ports disposed around the container, which outlet ports are in fluid communication with the enclosed atmosphere, wherein at least one of the plurality of outlet ports is equipped with a valve to control fluid flow therethrough, and wherein at least one of the plurality of outlet ports is sized and configured to be in fluid communication with either the second end of the suction pipe of the pump or with the collection tank.

4. A method according to claim 2 wherein the filter comprises a first filter element and a second filter element, and wherein the first filter element comprises a screen lining the container and wherein the second filter element comprises filter media disposed upon the first filter element.

5. A method according to claim 2 wherein the filter comprises a bag of liquid permeable material, the bag being sized and configured to receive the slurry as the slurry is received into the container.

6. A method according to claim 5 wherein the liquid permeable material is porous woven material.

7. A method according to claim 6 wherein the container comprises a transport container.

8. A method according to claim 5 wherein the liquid permeable material is porous non-woven material.

9. A method according to claim 2 wherein the container comprises a transport container.

10. A method according to claim 1 wherein the cover comprises a flexible non-porous material capable of conforming to an upper level of the slurry within the container.

11. A method according to claim 10 which further comprises loading slurry into the container through at least one closeable access port in the cover, wherein the access port is sized and configured to either receive slurry into the container or close during provision of the enclosed atmosphere.

12. A method according to claim 11 wherein the container comprises a transport container.

13. A method according to claim 1 wherein the container comprises a transport container.

* * * * *